J. G. ALEXANDER.
SPRING BEAM CULTIVATOR.
APPLICATION FILED OCT. 23, 1918.
1,335,928. Patented Apr. 6, 1920.
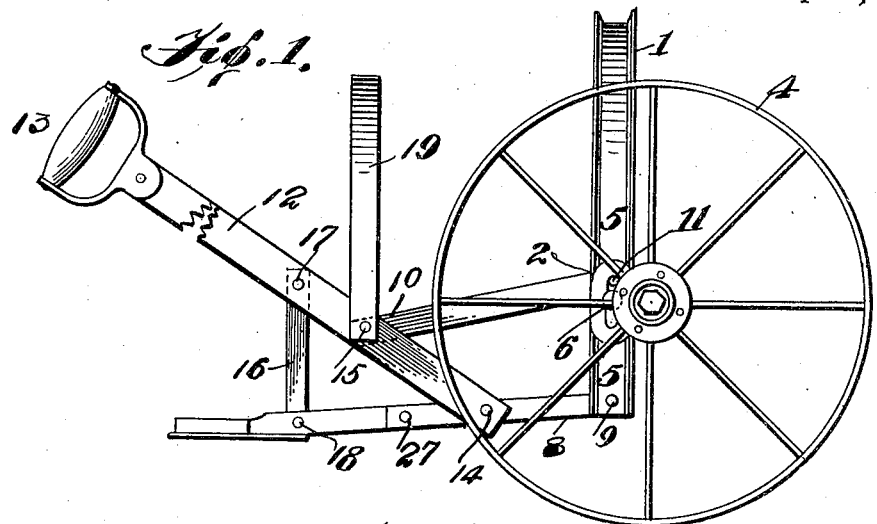
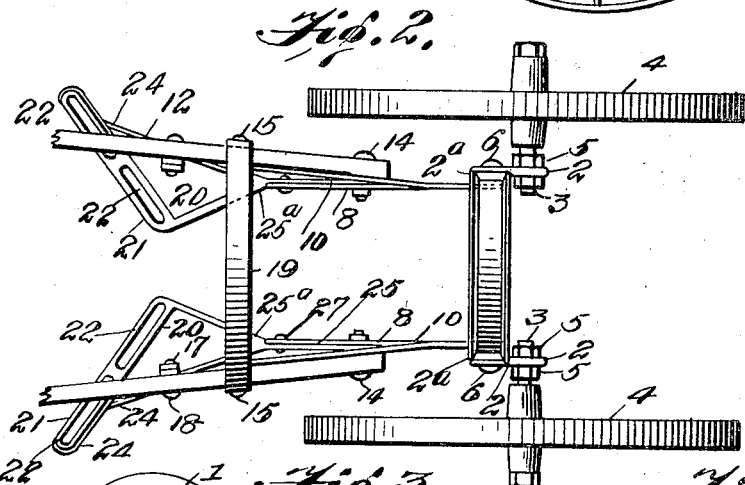
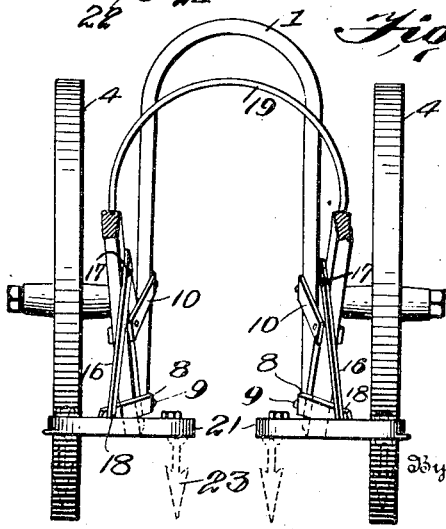
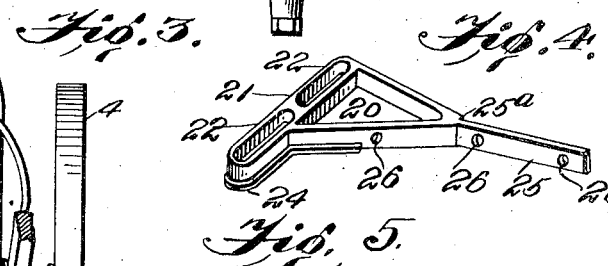
Inventor
James G. Alexander

UNITED STATES PATENT OFFICE.

JAMES G. ALEXANDER, OF AMES, IOWA.

SPRING-BEAM CULTIVATOR.

1,335,928.

Specification of Letters Patent.  Patented Apr. 6, 1920.

Application filed October 23, 1918. Serial No. 259,338.

*To all whom it may concern:*

Be it known that I, JAMES G. ALEXANDER, a citizen of the United States of America, residing at Ames, in the county of Story and State of Iowa, have invented certain new and useful Improvements in Spring-Beam Cultivators, of which the following is a specification, reference being had therein to the accompanying drawings.

This invention relates to a spring beam cultivator, and has for its object the provision of a spring arch to counteract the tendency of the spring beams to twist, and give a level lateral movement of the gang to and from the plants being cultivated.

It is to be understood that in the type of cultivators to which my invention relates, the beams are connected, at their forward ends, between the forward arch of the cultivator and the head frames and are supported upon the rear ends; the beams are made of light spring steel, and, consequently, without my improved spring arch, these beams would twist and thus throw the tillage tools out of proper contact with the soil. The spring arch counteracts this tendency of the beams to twist and produces a level lateral movement of the tillage tools to and from the row, thus making a success of this style of hand cultivator.

With this and other objects in view, my invention comprises certain novel combinations and constructions as hereinafter specifically described, illustrated in the accompanying drawings, and more particularly pointed out in the appended claims.

In the drawings:

Figure 1 is a view in side elevation of a cultivator constructed in accordance with the present invention, while Fig. 2 is a top plan view of the cultivator depicted in Fig. 1, with hand grips removed.

Fig. 3 is a rear view of the cultivator shown in Fig. 2.

Fig. 4 is a perspective view of one of the slotted head frames.

Fig. 5 is a fragmentary sectional view, taken on line 5—5, Fig. 1, and looking in the direction of the arrows.

Referring to the drawings by numerals, 1 designates the front arch, which is formed by bending the channel iron as shown. This front arch 1 is provided at opposite sides with adjustable wheel brackets 2, and connected to these wheel brackets 2 are stub shafts 3, upon which shafts are journaled wheels 4. Suitable lock nuts 5, 5, secure the stub shaft 3, in each instance, upon the bracket 2. The brackets 2 have beveled portions 2ª (Fig. 2) fitting the front arch 1, as shown, and by reason of the fastening bolt 6 the bracket is held in an adjusted position upon the channel arch 1.

Each wheel bracket 2 is provided with an elongated slot 7 which allows of the adjustment of the bracket upon bolt 6, so as to obtain an accurate adjustment of the forward end of the cultivator with respect to the ground that the cultivator is cultivating.

The primary spring steel beams 8, 8, are bolted or riveted at 9 to the lower end of the front arch 1, and the auxiliary spring steel beams 10 are secured by bolts 11 to the front arch 1; these bolts 11 extend through the slots 7 of the wheel brackets 2 (Figs. 1 and 5).

The handles 12, provided with suitable hand grips 13 (Fig. 1) are fastened at 14, near their lower ends, to the primary beams 8 intermediate the ends of said beams, and are fastened at 15 to the outer end of the upper or auxiliary beams 10. Vertical bracing bars 16 are connected at 17 to the handles 12, and at 18 to the primary beams 8.

A spring steel rear arch 19 is connected at 15 to the auxiliary beams 10 and handles 12; this spring arch 19 counteracts the tendency of the spring beams 8 and 10 to twist, and gives a level lateral movement to the tools carried by the slotted head frames (hereinafter described) to and from the plants being cultivated. This spring arch 19 braces the entire rear structure of the cultivator, as it is a yieldable or flexible connection for the support carrying the tools, whereby an expansion and contraction laterally is permitted of the tools with respect to their movement during cultivation I have preferably used a pair of slotted head frames in constructing a complete cultivator in accordance with the present invention, but as the principle of both head frames are identical, it will only be necessary to specifically describe one frame. Each frame (Fig. 4) comprises a substantially V-shaped body 20 that is provided in its rear portion 21 with a plurality of elongated slots 22 that are for the attachment of tools, indicated by dotted lines 23, Fig. 3, to the frame; the slot 22 allowing of an adjustment of the tools upon the frame. Beyond the outer face of the body 20, the outer end of the rear slotted portion 21 extends (see position Fig. 2) so as to permit of a comparatively wide cultivation owing to a tool or tools being placed at the extreme outer end of the frame, in the outer slot thereof.

The frame contiguous to the rear slotted portion 21 is reinforced by a horizontal web 24, which acts as a brace, strengthening or bracing the outer end of portion 21, thereby making it durable when it carries at its extreme end a cultivating tool. Extending from the inner end of the V-shaped body 20 is an integral extension 25, which extension 25 is provided with a plurality of apertures 26, in which apertures 26 are positioned the fastening means 14 and 27 (Fig. 2) for assembling the frame and more particularly securing said frame directly to the lower or primary beam 8. The extension 25 is off-set to one side by the inner end of the body 20, so to speak, (Fig. 4) producing a shoulder portion 25ª that is of the same depth as the width of the primary beam 8, so that when the beam 8 is resting against the extension 25 said beam and extension constitutes a practically solid connection, as shown, thereby producing a very strong and durable apparatus.

What I claim is:

1. In a cultivator of the class described, the combination, of a front arch, wheels attached to said front arch, spring beams attached to said front arch and extending rearwardly, a spring arch attached to said beams, tool supporting means, and means connecting said tool supporting means to said spring beams and spring arch.

2. In a cultivator of the class described, the combination, of a rigid arch and a yieldable arch, yieldable means connecting said arches, tool supporting means, means connecting said tool supporting means to said arches, wheels, and means connecting said wheels to said rigid arch.

3. In a cultivator of the class described, the combination, with a front arched channel iron, wheels connected to said channel iron, of a pair of spring primary beams connected to the lower ends of said arched channel iron, a pair of spring auxiliary beams connected to said channel iron above said primary beams, a rear spring arch, a pair of handles connected near their lower ends to the primary beams, means connecting the lower ends of the rear arch and the rear ends of the auxiliary beams to said handles, vertical braces connecting the primary beams and the handles together beyond the rear arch, and tool supporting means secured to the primary beams.

In testimony whereof I hereunto affix my signature.

JAMES G. ALEXANDER.